United States Patent
Kelsic et al.

(10) Patent No.: US 6,501,615 B1
(45) Date of Patent: Dec. 31, 2002

(54) DAMPENING MEMBER FOR ISOLATING ACTUATOR VIBRATION

(75) Inventors: Gary F. Kelsic, Longmont, CO (US); Aaron S. MacPherson, Fort Collins, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 18 days.

(21) Appl. No.: 09/592,636

(22) Filed: Jun. 13, 2000

Related U.S. Application Data
(60) Provisional application No. 60/150,720, filed on Aug. 25, 1999.

(51) Int. Cl.⁷ .............................................. G11B 33/14
(52) U.S. Cl. ................................ 360/97.02; 360/265.6
(58) Field of Search ................. 360/97.02, 265.2–265.6

(56) References Cited

U.S. PATENT DOCUMENTS

| | | | |
|---|---|---|---|
| 5,282,100 A | 1/1994 | Tacklind et al. | 360/97.02 |
| 5,291,110 A | 3/1994 | Andrews, Jr. et al. | 318/560 |
| 5,465,034 A | 11/1995 | Andrews, Jr. et al. | 318/560 |
| 5,483,398 A | 1/1996 | Boutaghou | 360/97.02 |
| 5,545,989 A | 8/1996 | Tian et al. | 324/212 |
| 5,598,306 A | 1/1997 | Frees et al. | 360/97.02 |
| 5,602,697 A * | 2/1997 | Jeong | 360/97.02 |
| 5,666,242 A | 9/1997 | Edwards et al. | 360/106 |
| 5,675,456 A | 10/1997 | Myers | 360/106 |
| 5,696,647 A | 12/1997 | Phan et al. | 360/78.07 |
| 5,726,852 A | 3/1998 | Phan et al. | 360/78.07 |
| 5,751,513 A | 5/1998 | Phan et al. | 360/78.07 |
| 5,760,992 A | 6/1998 | Phan et al. | 360/78.07 |
| 5,781,373 A | 7/1998 | Larson et al. | 360/97.02 |
| 5,825,585 A | 10/1998 | Hatam-Tabrizi | 360/97.02 |

* cited by examiner

*Primary Examiner*—A. J. Heinz
(74) *Attorney, Agent, or Firm*—Derek Berger

(57) ABSTRACT

A method and apparatus for isolating actuator noise for a disc-drive system. An isolation material and a plug are combined in such a way to prevent or lessen acoustic actuator noise from the actuator assembly from entering the base plate of a disc drive system. An isolation material and plug form a dampening element. A dampening element may be formed from the elastomeric material without the plug.

12 Claims, 12 Drawing Sheets

DAMPENING MEMBER FOR ISOLATING ACTUATOR VIBRATION

RELATED APPLICATIONS

This application claims the benefit under 35 U.S.C. 119(e) of U.S. Provisional Application Ser. No. 60/150,720 filed Aug. 25, 1999.

FIELD OF THE INVENTION

The present invention relates to the field of mass-storage devices. More particularly, this invention relates to a method and apparatus for isolating actuator noise from disc drives.

BACKGROUND OF THE INVENTION

Devices that store data are key components of any computer system. Computer systems have many different devices where data can be stored. One common device for storing massive amounts of computer data is a disc drive. The basic parts of a disc drive are a disc assembly having at least one disc that is rotated, an actuator that moves a transducer to various locations over the rotating disc, and circuitry that is used to write and/or read data to and from the disc via the transducer. The disc drive also includes circuitry for encoding data so that it can be successfully retrieved from and written to the disc surface. A microprocessor controls most of the operations of the disc drive, in addition to passing the data back to the requesting computer and taking data from a requesting computer for storing to the disc.

The disc drive includes a transducer head for writing data onto circular or spiral tracks in a magnetic layer the disc surfaces and for reading the data from the magnetic layer. In some drives, the transducer includes an electrically driven coil (or "write head") that provides a magnetic field for writing data, and a magneto-resistive (MR) element (or "read head") that detects changes in the magnetic field along the tracks for reading data.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film greatly reduces the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc-drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

When the disc assembly is rotated at high speed, the air adjacent to the spinning disc or discs is caused to move as well. This moving air moves between the rotating disc and the read/write transducer, creating an air bearing, and advantageously causing the transducer to "fly" over the disc surface.

The impact of high acoustic emissions from disc drives is well known in the art. High acoustic intensities and/or emission result in a less comfortable computing environment, and generally cause acoustic noise. Government agencies throughout the world are now requiring that the decibel level of average sound energy emanating from office equipment be substantially reduced. Computer manufacturers are also placing acoustic emission standards on disc drive manufacturers. Manufacturers of disc drives have also long recognized that certain improvements for data storage performance in disc drives, namely, to increase disc rotation velocity and to increase head actuator movement frequency, contribute to unwanted acoustic noise.

Several methods to reduce the intensity of unwanted acoustic noise have been attempted. Among the several methods are the use of external dampening techniques for the entire disc drive. For example, mechanically isolating the cover of a disc drive from the mechanical reinforcement structure with a continuous airspace. Many designers believe that most of the unwanted acoustic frequencies emanate from a "drum-like" top cover and from the base plate of the disc drive. Some designers have made strides in addressing the acoustic frequencies that escape from the top cover. The designers use cover dampeners and adhesives with inherent dampening properties on the cover. Other designers have attempted to isolate the transducer actuator in order to reduce the unwanted acoustic emissions at multiple frequencies. Such actuator isolation conventionally includes using plastic and rubber mounts on the pivot bearing assembly of the actuator. Many environments where disc drives are used are sensitive to the amount of acoustic emissions (or noise) coming from an operating disc drive. Therefore, it is desirable to reduce such acoustic noise.

Acoustic emissions are higher and more prevalent during rapid data access and storage operations, and in particular during "disc seek operations," or simply "seeks." A "seek" is movement of an actuator assembly from a first track to a second target track. Many attempts have been made to lower acoustic emissions during disc seeks. Previous attempts have either centered on dampening the acoustic energy already in a disc base plate by placing foam between a printed circuit board and the base plate, or on decoupling the spindle and actuator mechanism from its enclosure by using a plurality of rubber isolator mounts. Other attempts include moving the actuator with less force to reduce impulse forces and thus reduce large acoustic spikes. Nevertheless, each of these improvements have proved marginal, and some have been prohibitively costly. What is needed is a method and apparatus to substantially reduce unwanted acoustic emissions at or near the actuator. Also needed is an inexpensive method and apparatus.

SUMMARY OF THE INVENTION

A method and apparatus is described for isolating actuator noise in disc drives. An actuator isolator mount is provided in between the actuator and the base plate of the disc assembly. A disc drive includes an actuator assembly on a rotational axis, a base plate, and a dampening member for reducing acoustic noise from traveling in an axial direction in the actuator assembly. The dampening member is positioned between the actuator assembly and the base plate.

In some embodiments, the dampening member includes an energy absorbing material positioned to dampen vibrations substantially parallel to a rotational axis of the actuator assembly, and to dampen vibrations transverse to the rotational axis of the actuator assembly. The dampening member also may include a rigid dampening mount. The base plate of the disc drive may also have a stepped mounting surface and a shoulder for the dampening member. When the base plate includes a mounting surface for the actuator assembly, the dampening member is positioned substantially flush to the surface of the base plate within a counter bore therein, sized to receive the dampening member.

The dampening member may be cylindrical or may be a sleeve of elastomeric material fitting around a cylinder. The dampening member may also have a cylinder adjacent to a circular end of the cylinder and/or a through-opening. The dampening member reduces the acoustic noise on at least two axes. The dampener reduces acoustic noise due to a lateral vibration and a radial vibration.

Another aspect of the present invention provides a method for substantially reducing vibrations of the actuator assembly. Vibrations from the actuator assembly are reduced or prevented from entering a base plate of a disc drive. The method includes the steps of isolating vibrations that are substantially parallel to the rotational axis of the actuator assembly, and isolating vibrations that are transverse to the rotational axis of the actuator assembly. The isolating step includes mounting a dampening member to the base plate of a disc drive. Mounting the dampening member includes affixing a metal plug within a cavity in the base plate, holding the metal plug within the base plate to form a joint union, and inserting an elastomer in a fluid-state under atmospheric pressure in and around any space left between the joint union of the base plate and the metal plug. The elastomer seals the joint union.

The joint union of the base plate, the elastomer, and the metal plug are also cured. Curing yields the advantageous acoustic absorption properties.

A method for reducing ambient disc drive acoustic emissions includes forming a recessed cavity within a base plate, integrating a polymer dampening material with the base plate, forming the polymer in a shape to dampen acoustic noise, and attaching an actuator to the polymer. In one embodiment, integrating includes fabricating the base plate and the polymer as a unitary body using injection molding. Integrating the polymer to the base plate may also include fabricating the base plate and the polymer as a unitary body using transfer molding. An adhesive may also be used to integrate the polymer to the base plate. The adhesive used has substantial dampening properties.

DESCRIPTION OF THE PREFERRED EMBODIMENT

In the following detailed description of the preferred embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

The invention described in this application is useful for all types of disc drives, including hard-disc drives, ZIP drives, floppy-disc drives, and any other type of drives, systems of drives (such as a "redundant array of inexpensive/independent disc drives," or RAID, configuration) or other devices, where a disc assembly is rotated within a housing.

Figure 1:
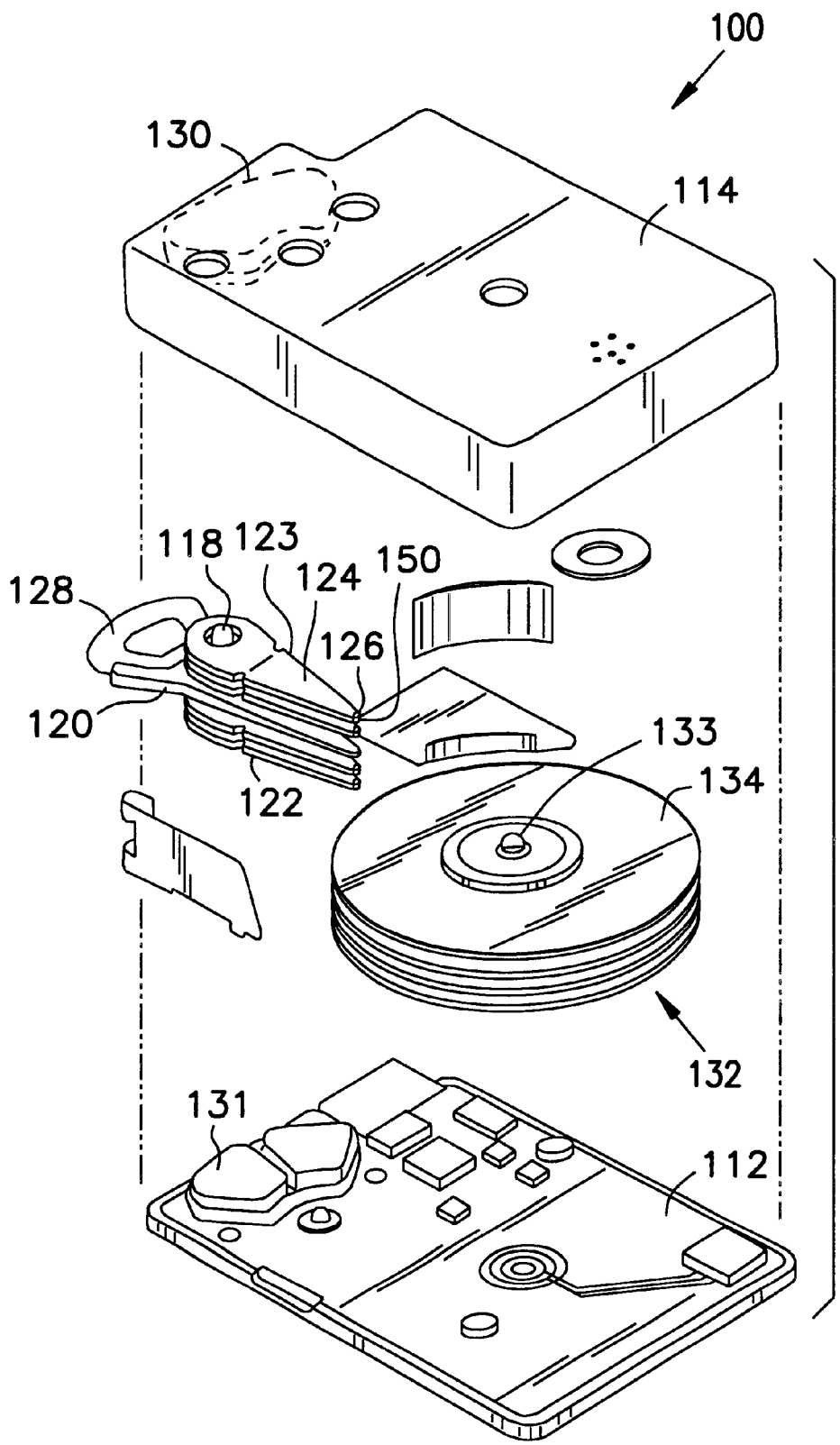
FIG. 1 is an exploded view of a disc drive with a multiple disc stack.

The invention described in this application is useful with many electrical and mechanical configurations of disc drives having either rotary or linear actuation. In addition, the invention is also useful in all types of disc drives including hard disc drives, zip drives, floppy disc drives and any other type of drives where providing a low-noise current source for the transducer may be desirable. FIG. 1 is an exploded view of one embodiment of the present invention, this embodiment showing one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. In some embodiments, transducer 150 includes a electromagnetic coil write head 97 and a magneto-resistive read head 98 (see FIG. 2, below). The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called spindle hub 133. In this particular disc drive, the spindle motor is within hub 133. In FIG. 1, a number of discs 134 (one or more; four are shown) are attached to the spindle hub 133 to form disc assembly 132. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
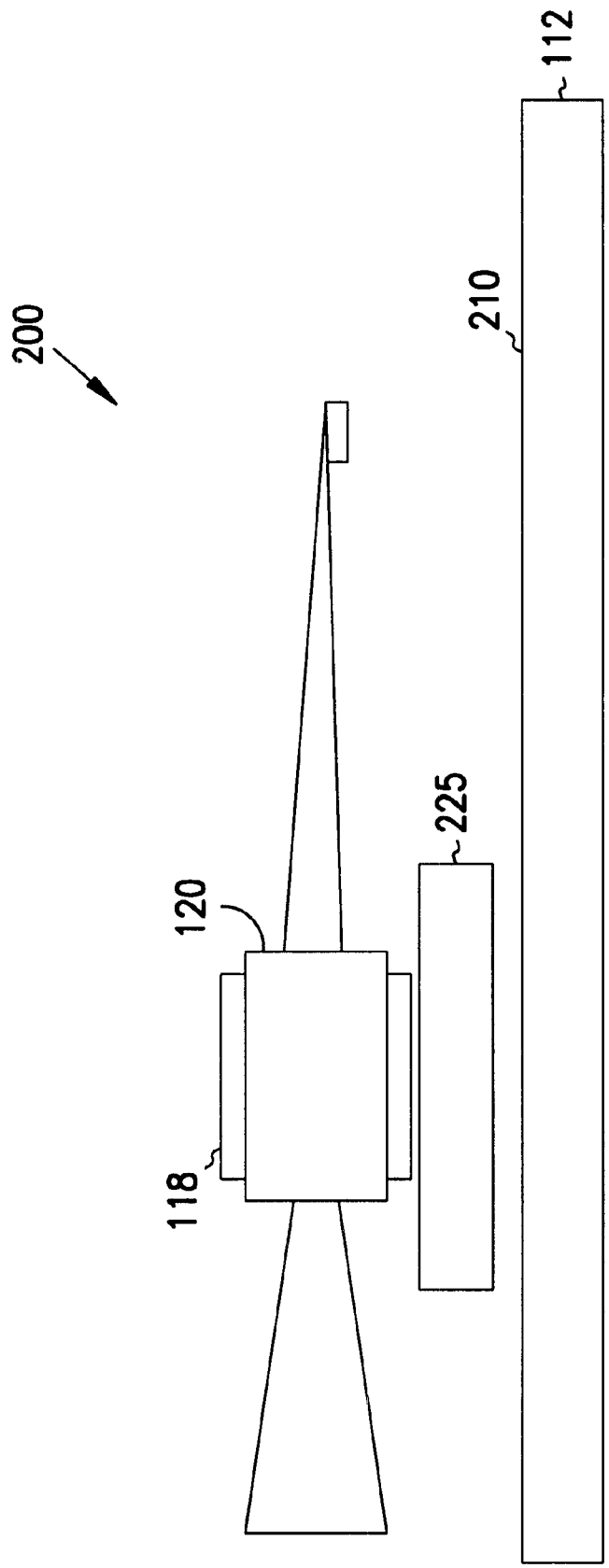
FIG. 2 is a diagrammatic view of an actuator assembly rotatably attached to the base plate and incorporating a dampening member of the present invention.

FIG. 2 is a schematic diagram of an actuator isolator mount 200 incorporating the present invention. In some embodiments, as shown in FIG. 2, base plate 210 supports dampening member 225. Dampening member 225 provides an acoustic isolating function for actuator assembly 120 during seek operations. In other words, the dampening member 225 dampens moments produced as a result of the actuator seeking. As mentioned above, the actuator assembly 120 is the assembly within the disc drive that moves the transducer over the disc to different track locations for read and write operations.

Consequently, the present invention lessens acoustic emissions from the disc drive. For every force that is imparted inside the disc drive there is an opposite force, so when the actuator is moved rapidly from one disc location to another, an impulse force is placed onto the actuator. An opposite or reactionary force opposing the impulse force is produced by the base plate of the head disc assembly ("HDA"). A common requirement for disc drives has been to perform seeks quicker. Quicker seeks translate into larger impulse forces applied to the actuator assembly 120.

The dampening member 225 absorbs a portion of the energy between the actuator assembly 120 and the base plate 112 to limit the amount of energy transferred to the base plate 112. The base plate 112 and the top cover 114 are large surfaces within the disc drive 100. In the presence of an impulse force, such as the forces used to move the actuator during seek operations, a large surface acts like a drum or stereo speaker. When the actuator assembly 120 is subjected to an impulse force, the impulse force is transferred to the base plate 112 much like pounding on a drum. The impulse force induces a vibration and energy into these large structures of the base plate. The base plate then vibrates at multiple frequencies, and in multiple modes. The vibrations translate into sound energy.

Another analogy is to a stereo speaker. In a stereo speaker, a small actuator imparts energy on a large conical surface. The conical surface vibrates and creates sound as it moves the air to form sound waves. In a disc drive, the small actuator is the actuator assembly and the surface is the base plate. The basic idea is to dampen the junction between the base plate 112 and the actuator assembly 120 so that little, if any, vibration is imparted to the base plate 112. The dampening member 225 absorbs vibrational energy to prevent or substantially lessen transfer of this energy to the base plate 112. As a result, the base plate 112 does not vibrate or vibrates much less. The base plate 112 produces little or no sound or acoustic energy.

It should be noted that the top cover 114 can also act as a large surface which can vibrate to produce sound energy. In the disc drive shown, the actuator assembly 120 is attached only to the base plate 112. In some disc drives, the actuator shaft 118 of the actuator assembly is captured or attached at both ends. In these configurations, a similar dampening member 225 is used between the top plate 114 and the shaft of the actuator assembly 120.

Designers go to great lengths to keep the top cover of the HDA as acoustically quiet as possible. For instance, cover dampers and special adhesives with damping properties are placed between the top cover and another damper placed on top, because these materials receive motion and vibration and ultimately dampen the absorbed motion and vibration.

In the present invention, the dampening member 225 is made from FLOUREL which is available from 3M of St. Paul, Minn. FLOUREL is a product which has a very high damping characteristic. Another similar material can be used in the present invention to provide high dampening between the actuator assembly 120 and the base plate 112 to prevent or significantly reduce the energy transferred to the base plate 112. Additionally, the acoustic dampening or energy absorbing properties should operate uniformly over the operating temperature of the disc drive. For example, if a disc drive is capable of operating in environments ranging from 10–50° C., then the dampening material has to perform admirably over the same temperature range.

The dampening element 225 dampens axial vibrations from actuator shaft 118, as well as radial and rotational vibrations. The dampening element 225 is also designed to have sufficient stiffness for positioning of the slider 126 and incorporated transducing head 150.

In other words, the dampening member 225 substantially reduces vibrations, from traveling down actuator shaft 118 of actuator assembly 120. Vibrations traveling down the length of actuator shaft 118 are commonly referred to as axial vibrations, because of the axial direction in which they occur. By reducing axial vibrations, the base plate 112 is not subjected to the axial vibrations traveling along actuator shaft 118. Some axial vibrations may travel to base plate 112, however, the dampening element substantially reduces these vibrations. As such, any drum-like sounds caused by these vibrations within base plate 112 are reduced or are nearly non-existent. In several of the accompanying figures, arrows depict the path of the radiated noise/vibrations. However, the arrows do not depict the intensity of the radiated noise/vibrations.

FIG. 2 shows a dampening member 225 as a shaped dampening unit which attaches to an actuator mounting surface on the baseplate 112. The mounting surface could be a flat surface 210 of the base plate 112 or a recess with the flat surface 210 of the base plate 112.

Figure 3:
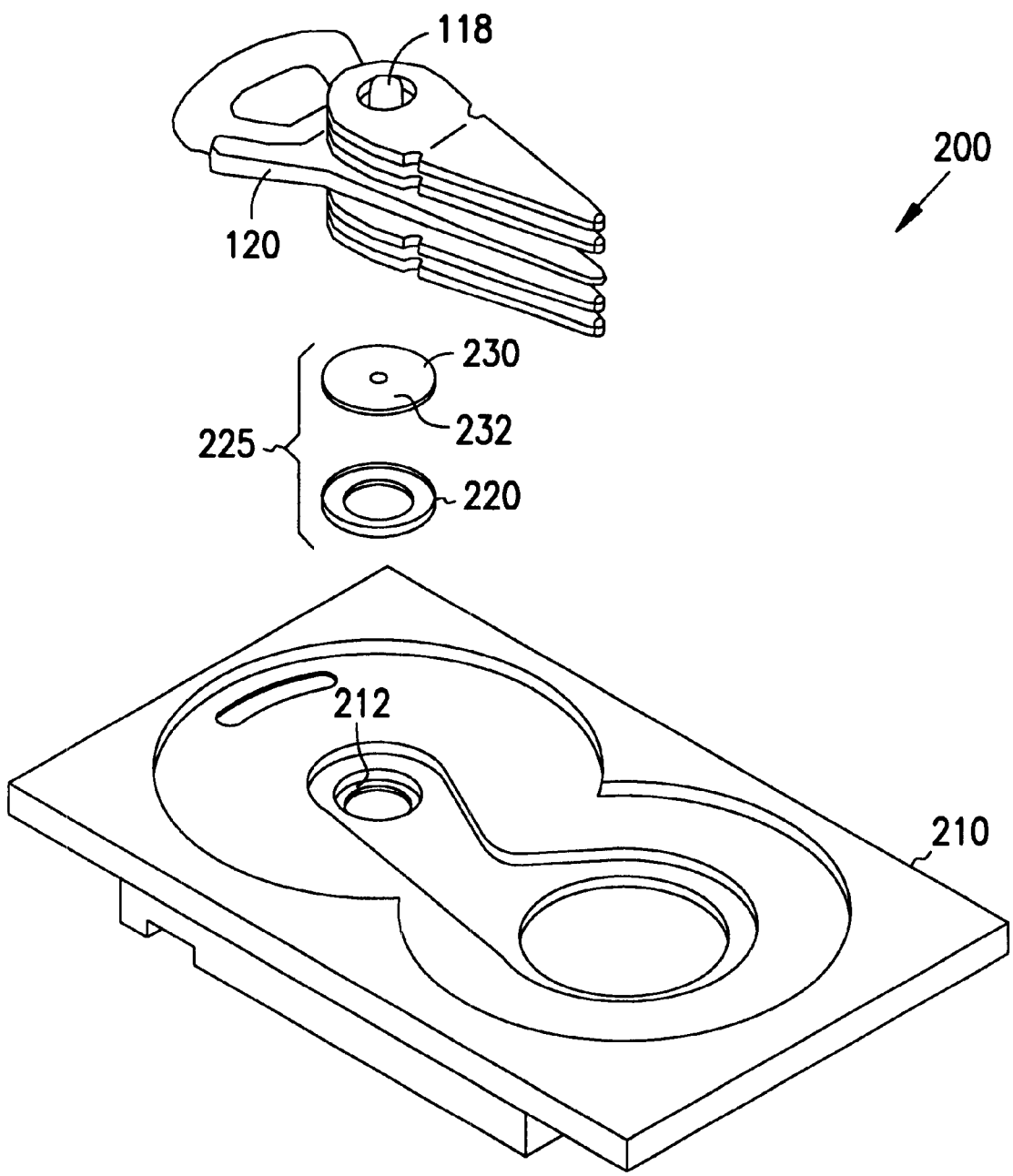
FIG. 3 is an exploded isometric view.

FIG. 3 shows another embodiment of the invention in which the dampening element 225 includes a metal plug 230. The metal plug 230 is also called an actuator mount or dampening mount. An isolator 220 made of isolation material may then fit around the metal plug 230 to form the dampening element 225.

In some embodiments of the invention, the plug 230 may be injection or insert molded to position isolation material 220 between base plate 112 and metal plug 230. Base plate 112 receives metal plug 230. Both are firmly held in place while an elastomer in a fluid-state flows into all the spaces, gaps, or recesses that lie between base plate 112 and metal plug 230. The base plate 112, metal plug 230, and fluid elastomer 220 are held in place as the elastomeric material is cured or vulcanized. Curing or vulcanization is required so that the isolator 220 reaches a state with a predetermined acoustic absorption characteristic.

In the embodiment shown in FIG. 3, the dampening member 225 is constructed from isolation material 220, and an actuator mount or metal plug 230. The isolation material 220 includes a polymer or elastomer material, such as FLOUREL. In such embodiments, the actuator mount 230 is an aluminum plug having mounting surface 232. Several states of hardness and thickness of the actuator mount may be utilized to achieve a predetermined absorption characteristic or value. For example, actuator mount or metal plug 230 may have a diameter of 15–20 millimeters and a thickness of 1.5–4 millimeters. In contrast, the isolation material 220 can be as thin as 0.25 millimeters. Empirical results based on the size and the mass of actuator mount 230 can be used to develop different formulation to reduce the overall transmission of energy. The combination of isolation material 220 and the actuator mount 230 is seated in a recessed cavity 212 of base plate 112. In yet another embodiment, recessed cavity 212 has a stepped mounting surface.

It is desirable to reduce any noise or other acoustic emissions from entering the base plate. As such, actuator 120 is mounted to dampening member 225 to isolate and absorb vibrations from the actuator assembly 120 and specifically the actuator shaft 118 during seek operations.

FIGS. 4–11 show various embodiments of the dampening element 225 used for mounting the actuator assembly 120 (more specifically the actuator shaft 118) to the base plate 118.

Figure 4:
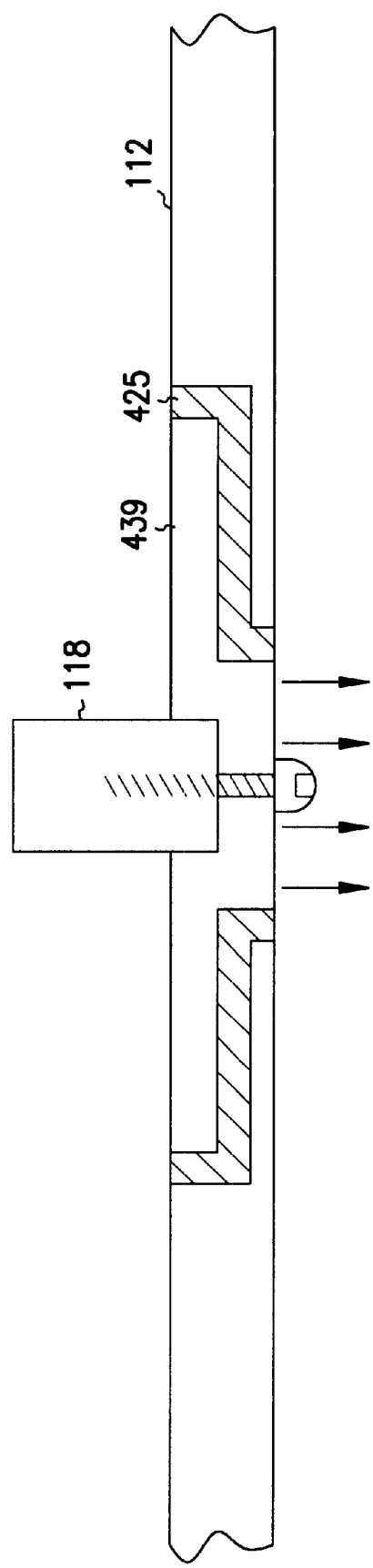
FIG. 4 is a cut-away side view of another embodiment of an actuator assembly rotatably mounted to a base plate with a dampening member having a metal tab.

FIG. 4 is a schematic diagram depicting a cross-section view of another embodiment of the present invention. In such an embodiment dampening mount 425 is seated underneath plug 439. In this configuration dampening mount 425 and plug 439 are recessed within base plate 112. The plug 439 provides a channel for acoustic emissions to travel through by way of plug 439. Base plate 112 remains acoustically isolated as a result of dampening mount 425 providing separation of the base plate 112 and plug 439.

Figure 5:
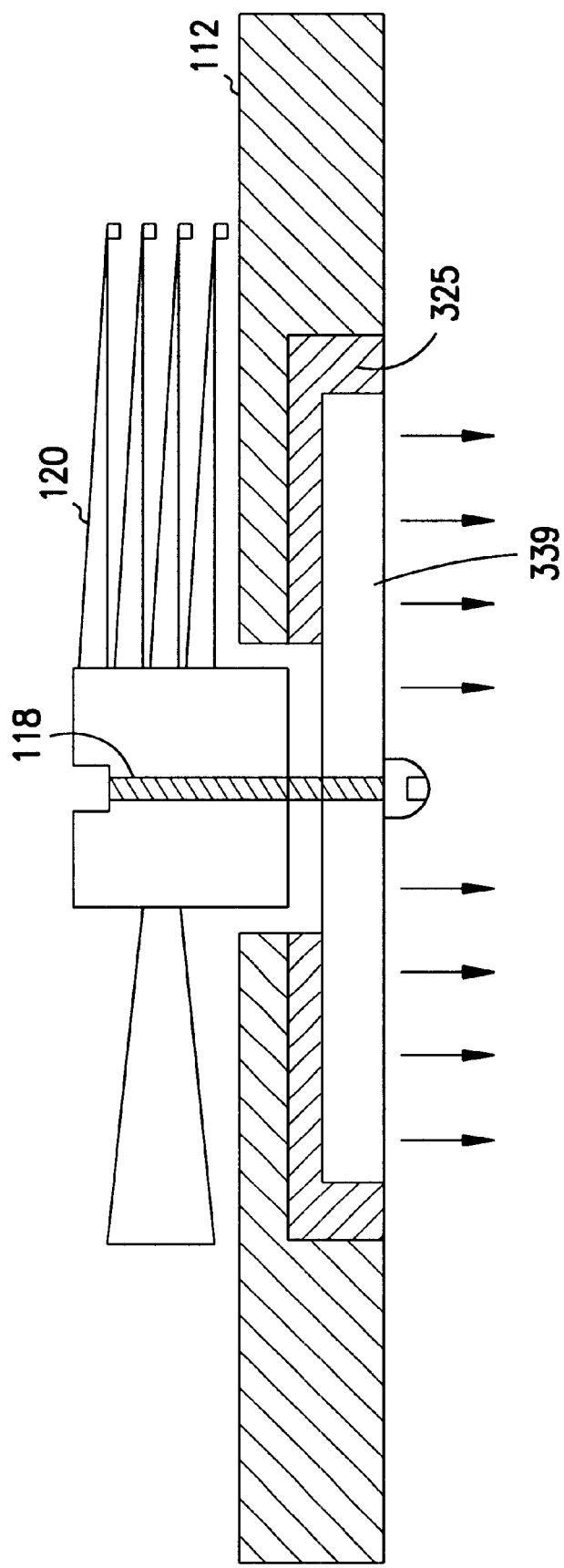
FIG. 5 is a cut-away side view of another embodiment of an actuator assembly rotatably mounted to a base plate with a dampening member having a metal tab.

FIG. 5 is a schematic diagram depicting a cross-section view of another embodiment of the present invention. In such an embodiment dampening mount 325 is seated upon plug 339. In this configuration dampening mount 325 and plug 339 essentially lie underneath base plate 112. Screw 338 mechanically couples actuator shaft 118 to the base plate 112, the isolation material 325, and the plug 339. This embodiment allows vibrations in the actuator shaft 118 to be absorbed by the isolation material 325 before entering base plate 112.

Figure 6:
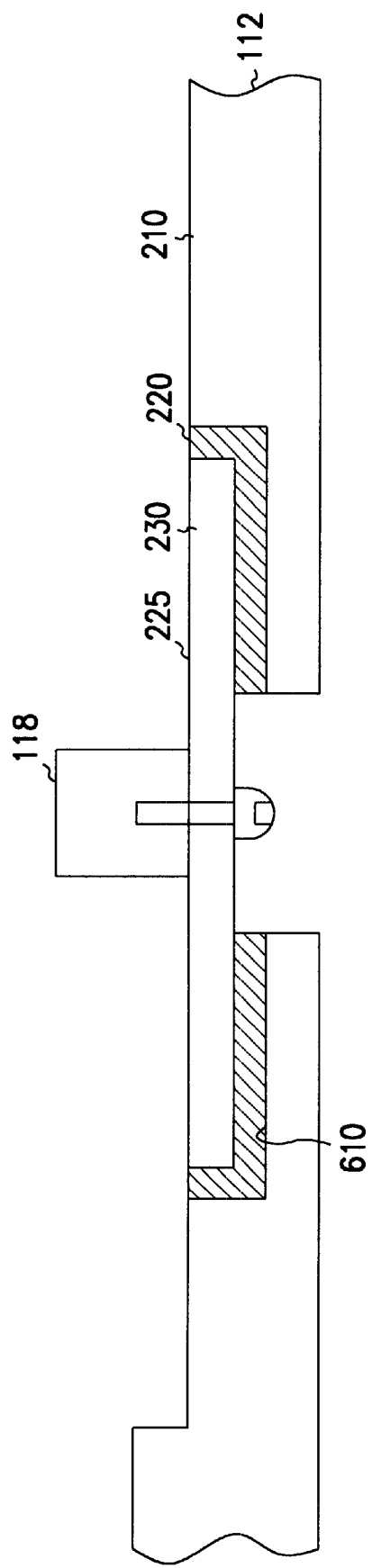
FIG. 6 is a cut-away side view of another embodiment of an actuator assembly rotatably mounted to a base plate with a dampening member having a metal tab.

FIG. 6 is a cut-away side view of another embodiment of the actuator assembly rotatably mounted to the base plate with a dampening member having a metal tab. In FIG. 6, the actuator shaft 118 is shown as opposed to the entire actuator assembly 120. The metal tab or mounting plate 230, also known as a mounting plate, is attached directly to the actuator shaft 118. The base plate 112 includes an opening 610 therein. The opening is oversized with respect to the mounting plate 230. An elastomeric material 220 is placed between the opening 610 of the base plate and the mounting plate 230 of the dampening member 225. It should be noted that the opening 610 is within the surface 210 of the base plate. The vibrations that are transmitted from the actuator shaft 118 are then transferred to the metal tab or mounting plate 230 and into the elastomeric material 220. The elastomeric material 220 absorbs the vibrations both axial and transverse to the axis of the shaft 1 18 and mitigates their transmission to the base plate 112.

Figure 7:
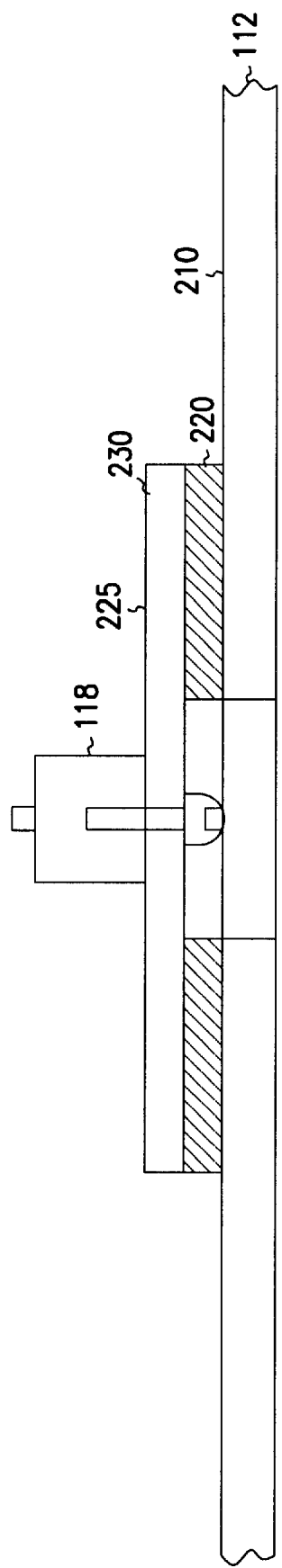
FIG. 7 is a cut-away side view of another embodiment of an actuator assembly rotatably mounted to a base plate with a dampening member having a metal tab.

FIG. 7 is yet another embodiment of an actuator assembly rotatably attached to a base plate. As in FIG. 6, the actuator shaft 118 is only shown, as opposed to the entire actuator assembly 120. The actuator shaft 118 is shown devoid of the remaining part of the actuator assembly for the purpose of clarity. The actuator shaft 118 is attached rotatably to a mounting plate 230. An elastomeric material is mounted to a portion of the mounting plate 230 on one side and is mounted to the surface 210 of the base plate 112. Thus, the elastomeric member 220 is sandwiched between the base plate 112 and the mounting plate 230 of the actuator assembly. The elastomeric material 220 and the mounting plate or metal tab 230 form the dampener 225.

FIG. 7 differs from FIG. 6 in that the base plate 112 does not include a recess or opening therein into which the dampening element 225 fits. In the current embodiment, the isolation or elastomeric material 220 is atop the surface 210 of the base plate.

Figure 8:
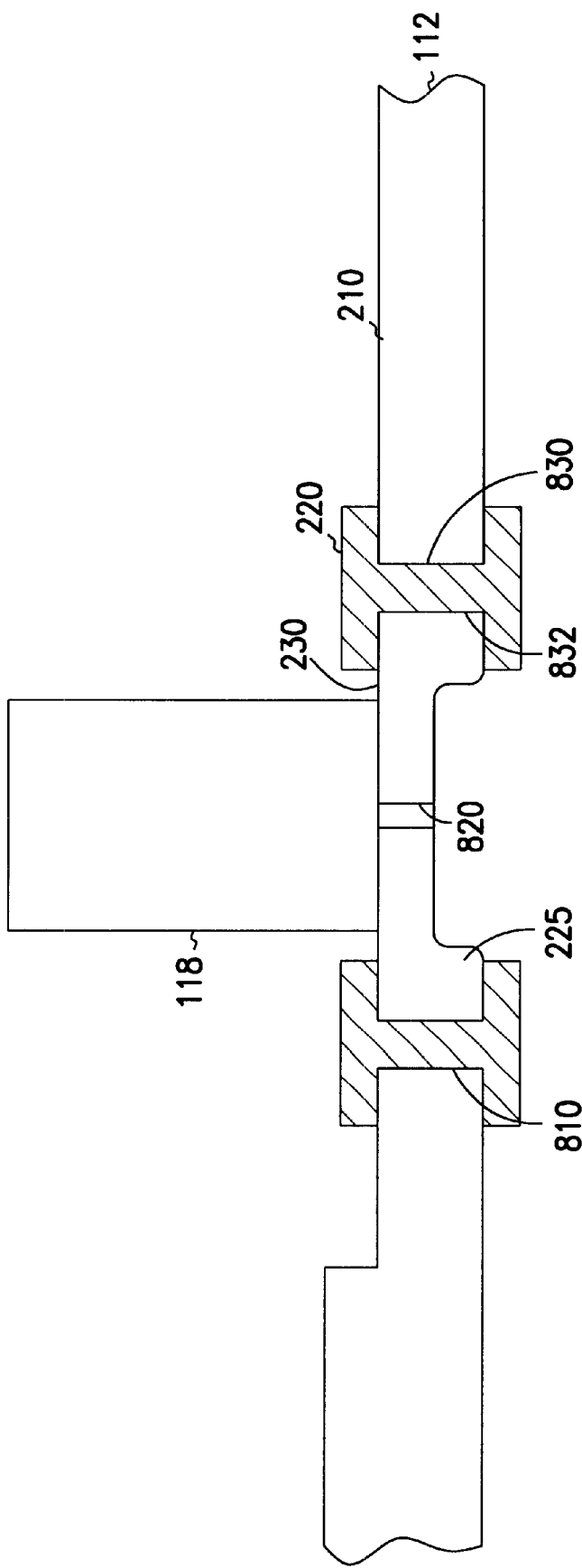
FIG. 8 is a cut-away side view of another embodiment of an actuator assembly rotatably mounted to a base plate with a dampening member having a metal tab.

FIG. 8 shows another embodiment of an actuator assembly, and more specifically, the actuator shaft 118 attached to a base plate 112. In this particular embodiment, the base plate 112 includes an enlarged through-opening 810. The through-opening 810 is annular in shape. The metal plug is also annular in shape and includes a through-opening 820. An appropriate fastener is passed through the through-opening 820 in the metal plug or actuator mounting plate 230. The fastener fastens the actuator shaft 118 to the mounting plate or metal tab 230. The isolation mount or elastomeric material 220 is also annularly shaped. The isolation or elastomeric material is formed in a grommet-like shape. On the outer surface of the grommet is a first channel 830 which fits into the annular opening 810 in the base plate 112. The inner portion of the elastomeric material includes a channel 832 which fits over the mounting plate or metal tab 230. A grommet-shaped isolation member 220 and the mounting plate or metal tab 230 form the dampening member 225. The dampening member 225, and more specifically, the isolation member 220 absorb vibrations which are transverse to the axis of the actuator shaft 118, as well as coaxial or parallel to the axis of the actuator shaft 118.

Figure 9:
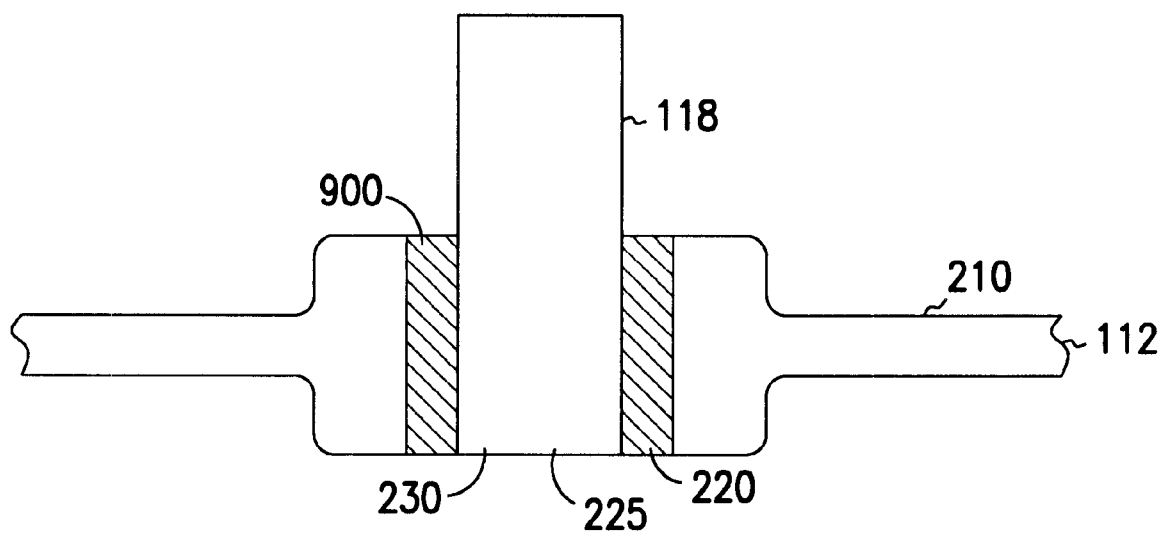
FIG. 9 is a cut-away side view of another embodiment of an actuator assembly rotatably mounted to a base plate with a dampening member having a metal tab.

FIG. 9 shows another cross section of yet another embodiment of the apparatus for isolating the actuator noise. In this embodiment, the base plate 112 includes a thickened portion in the area of where the actuator shaft 118 of the actuator assembly is attached to the mounting plate 230. In this particular embodiment, the mounting plate 230 is approximately the same thickness as the base plate near the mounting plate. The elastomeric isolation material 220 is formed in a cylindrical sleeve shape. The isolation mount fits over the metal tab or mounting plate 230. The mounting plate 230 and elastomeric sleeve 220 fit within an opening 900 in the base plate 112. The elastomeric material, therefore, can absorb vibrations both along the axis of the actuator shaft 118 as well as transverse to the axis of the actuator shaft 118. This lessens acoustic noise in that these vibrations will be absorbed or substantially absorbed by the elastomeric isolation material 220 before they can be transmitted to the base plate 112.

Figure 10:
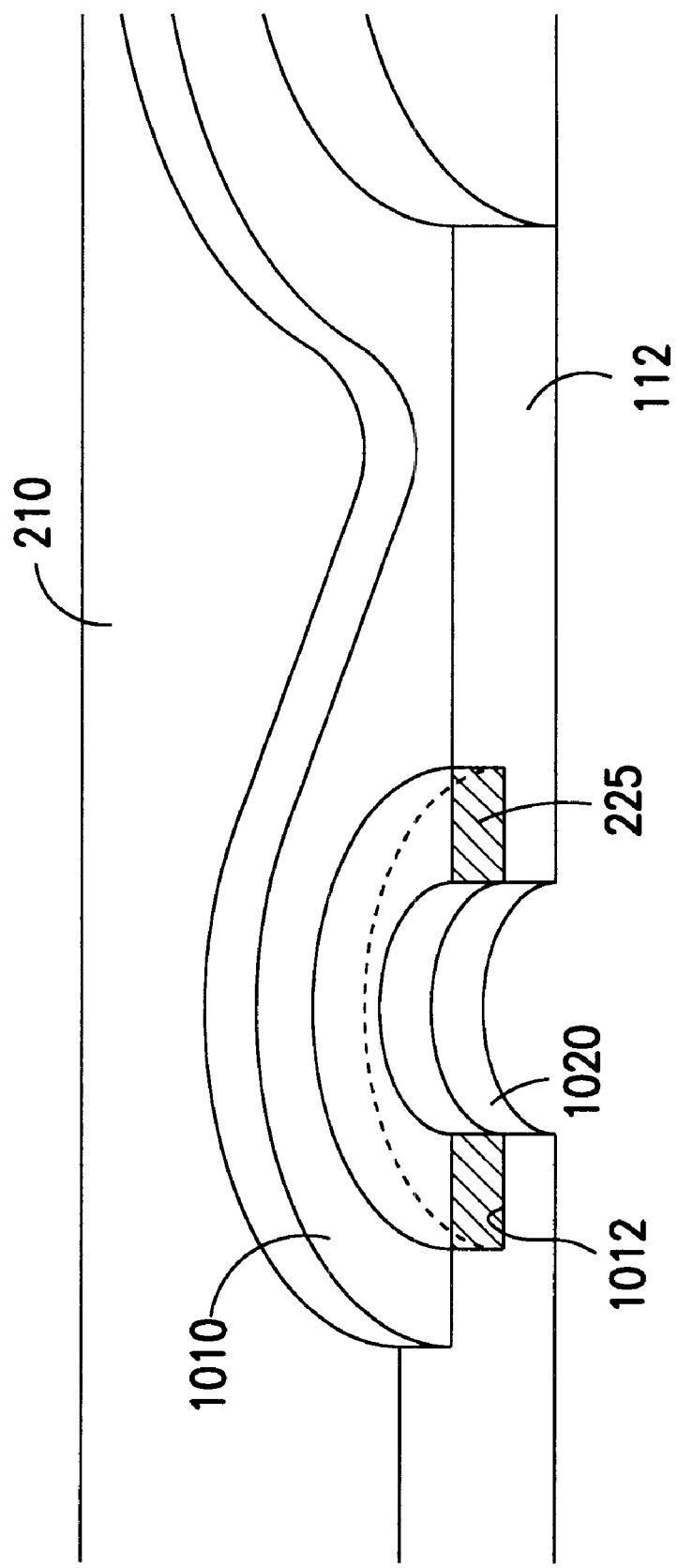
FIG. 10 is an isometric cut-away view of a base plate with a stepped recess and having a dampening member therein.

FIG. 10 shows an isometric cut-away view of a base plate 112 having stepped regions. A dampening member 225 is fit within one of the stepped regions. More specifically, the base plate includes a main interior surface 210. A first step forms a surface 1010 on the interior surface of the base plate 112. The surface 1010 is not necessarily annular in shape but generally encompasses several of the components or mounting areas within the disc drive 100. A second step 1012 is formed as an annular step down near the opening 1020 where the actuator assembly (not shown) will be mounted. Fitting on the step is the elastomeric dampener 225. In this particular embodiment, the elastomeric dampener 225 is essentially a donut-shaped gasket that fits on the surface 1012. The actuator shaft (not shown) of the actuator assembly will fit within the opening 1020 and will include a flange which contacts the dampening element 225. The dampening element 225 mitigates vibrations from the actuator shaft from entering the base plate 112, thereby eliminating or substantially lessening the amount of acoustic noise produced by the disc drive.

Figure 11:
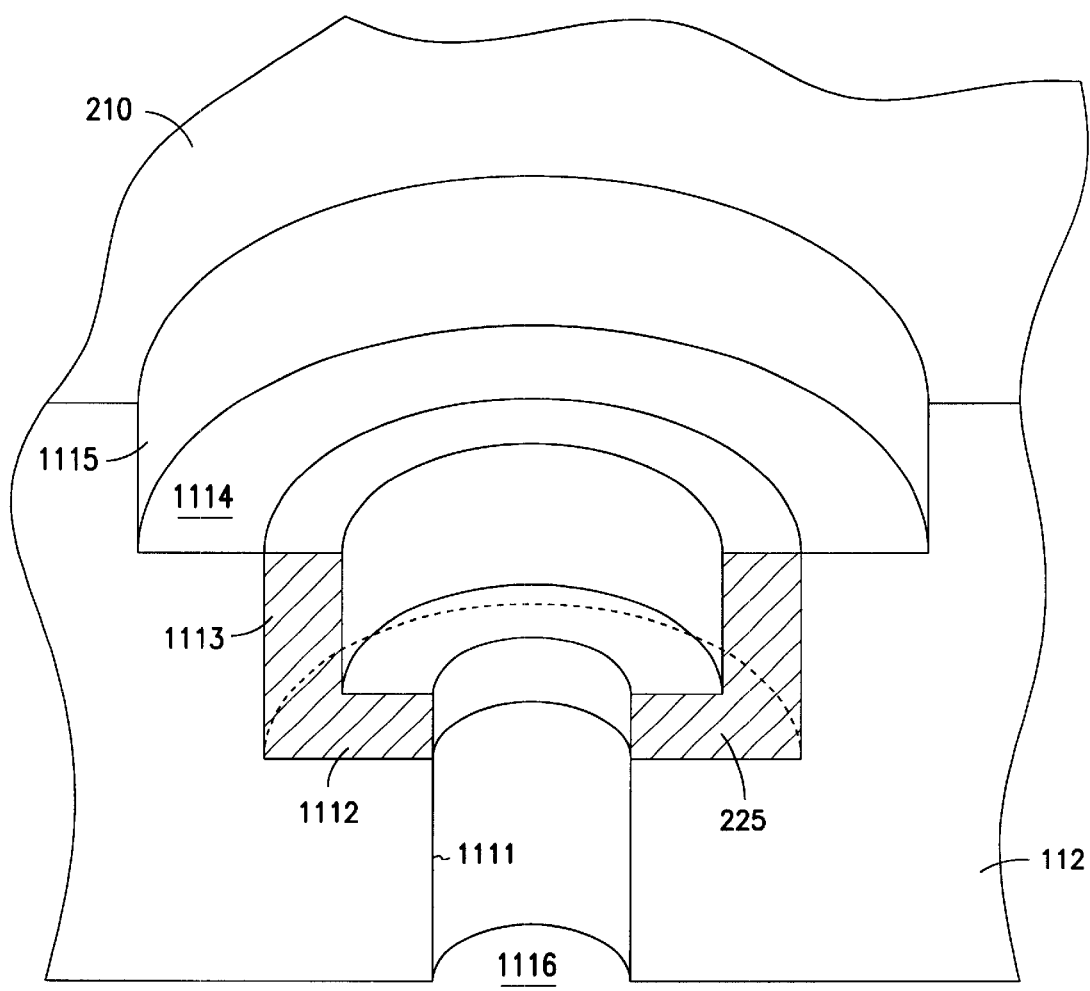
FIG. 11 is an isometric cutaway view of a base plate with a stepped recess and having a dampening member therein.

FIG. 11 shows yet another embodiment of the invention in which the base plate 112 includes a pair of annular steps from a surface 210 of the base plate 112. The base plate includes an opening 1116 through which the actuator shaft (not shown) of an actuator assembly will be mounted to the base plate 112. Two step ups or step downs are formed in the base plate. A first step 112 has an annular opening which is slightly larger than the opening 1116. The annular opening forms a ledge 1112 having a sidewall 1113. A further annular opening is formed having a diameter larger than the opening 1116 and diameter of the annular surface 1112. This particular annular opening forms a second ledge or surface 1114 having a sidewall 1115 which extends between surface 1114 and surface 210 on the interior of the disc drive. A dampening member 225 fits within one of the steps. The dampening member 225 has an L-shaped cross section and is generally annular shaped. One wall of the L fits against surface 1112 and the other side of the L-shaped cross section fits against the wall 1112. In essence, the dampening element 225 is cup-shaped and fits over the end of the actuator shaft 1118 and will be enveloped by the cup-shaped dampener 225. The vibrations from the actuator shaft (not shown) will be absorbed by the dampener 225 before being transmitted to the base plate 112.

Figure 12:
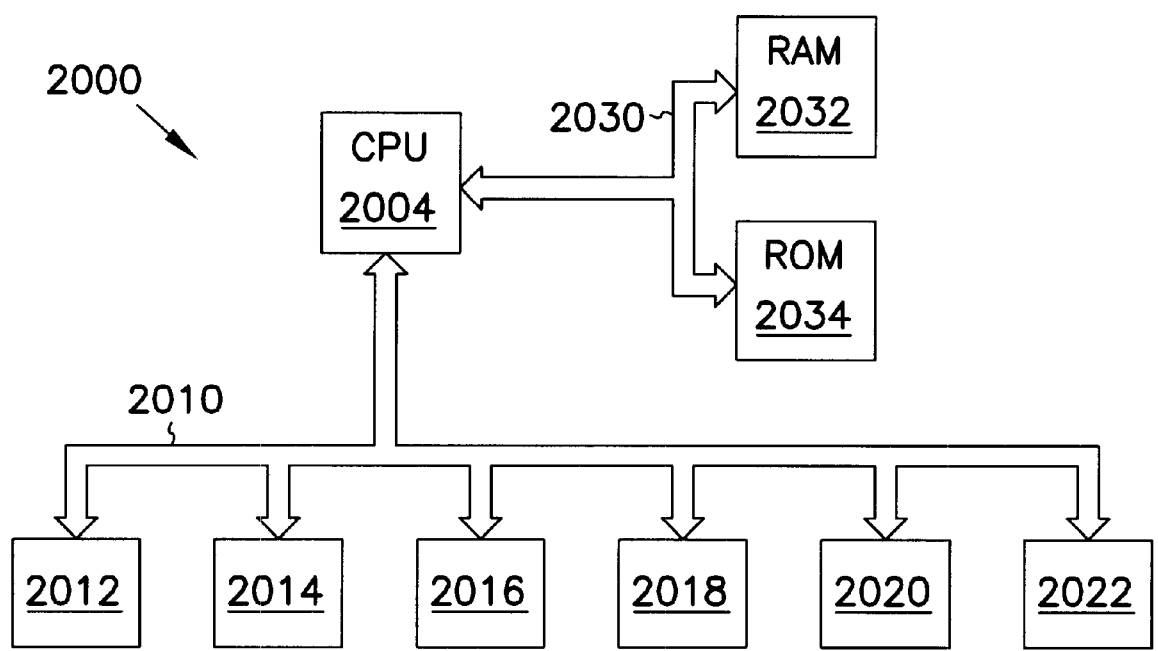
FIG. 12 is a diagram of an information handling system.

FIG. 12 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 22010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

CONCLUSION

Described above is a method and apparatus for isolating actuator noise in a disc-drive system. One embodiment provides a disc drive 100 having a rotary actuator. The disc drive includes a base 112 and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. At the far end of the separate arms 123 is a magnetic transducer 150. In some embodiments, transducer 150 includes an electromagnetic coil write head 97 (not shown) and a magneto-resistive read head 98 (not shown).

In one embodiment a disc drive (100) includes an actuator assembly (240) on a rotational axis, a base plate (210), and a dampening member (225) for reducing acoustic noise from traveling in an axial direction in the actuator assembly (240). The dampening member (225) is positioned between the actuator assembly (240) and the base plate (210).

In some embodiments, the dampening member includes an energy absorbing material positioned to dampen vibrations substantially parallel to a rotational axis of the actuator assembly (240), and to dampen vibrations transverse to the rotational axis of the actuator assembly (240). The dampening member also may include a rigid dampening mount. In some embodiments, disc drive (100) further includes a stepped mounting surface (212) and a shoulder for the dampening member (225).

In one embodiment, wherein the base plate (210) includes a mounting surface for the actuator assembly (240), the dampening member (225) is positioned substantially flush to the surface of the base plate (210). For such an embodiment, the base plate (210) has a counter bore therein to receive the dampening member (225).

In some embodiments, dampening member (225) is a cylinder. In other embodiments, dampening member (225) further includes a sleeve of elastomeric material fitting around the cylinder. Moreover, the dampening member may have a cylinder adjacent to a circular end of the cylinder and/or a through-opening.

In another embodiment, dampening member (225) reduces the acoustic noise on at least two axis. The acoustic noise may include a lateral vibration and a radial vibration.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A disc drive comprising:
   an actuator assembly having a shaft rotational axis;
   a base plate having an opening therein for mounting the actuator assembly to the base plate, the opening forming a recessed shoulder area in the base plate;

a cup-shaped dampening member for reducing the transmissions of vibration from the shaft of the actuator assembly to the base plate, the cup-shaped dampening member fitting within the recess in the base plate; and an annular mounting plate which fits within the cup-shaped dampening member, the actuator assembly mounted to the annular mounting plate and compressing a portion of the cup-shaped dampening member which is substantially perpendicular to the shaft of the actuator assembly and between the recessed shoulder and the annular mounting plate.

2. The disc drive of claim 1 wherein the cup-shaped dampening member further comprises:

an energy-absorbing isolator material.

3. The disc drive of claim 2 wherein the cup-shaped dampening element dampens vibrations substantially parallel to the shaft of the actuator assembly.

4. The disc drive of claim 1 wherein the cup-shaped dampening member dampens vibrations substantially parallel to the shaft of the actuator assembly.

5. The disc drive of claim 1 wherein the cup-shaped dampening element includes a sidewall that envelopes the edge of the annular mounting plate to dampen vibrations transverse to the shaft of the actuator assembly.

6. The disc drive of claim 1 wherein the actuator mounting plate, the shoulder formed in the baseplate, and the cup-shaped dampening member positioned within the recess formed by the opening, are substantially flush to the surface of the base plate near the opening.

7. The disc drive of claim 1 further wherein the base plate has an interior surface and an exterior surface, the opening in the base plate facing the interior surface of the baseplate.

8. The disc drive of claim 1 wherein the annular actuator mounting member has a diameter substantially equal to the width of the actuator assembly.

9. The disc drive of claim 1 wherein the annular actuator mounting member has a diameter less than the width of the actuator assembly.

10. The disc drive of claim 1 wherein the dampening member reduces vibration in at least two axes, the vibration including:

a lateral vibration; and a radial vibration.

11. The disc drive of claim 1 wherein the dampening member reduces a plurality of modes of vibration.

12. The disc drive of claim 1 further comprising:

a spindle rotatably attached to the base plate;

at least one disc attached to the spindle, the disc including a surface for storing data; and a transducing head attached to the actuator assembly, the actuator assembly moving the transducing head to a plurality of positions on the surface of the disc.

* * * * *